United States Patent Office 2,758,033
Patented Aug. 7, 1956

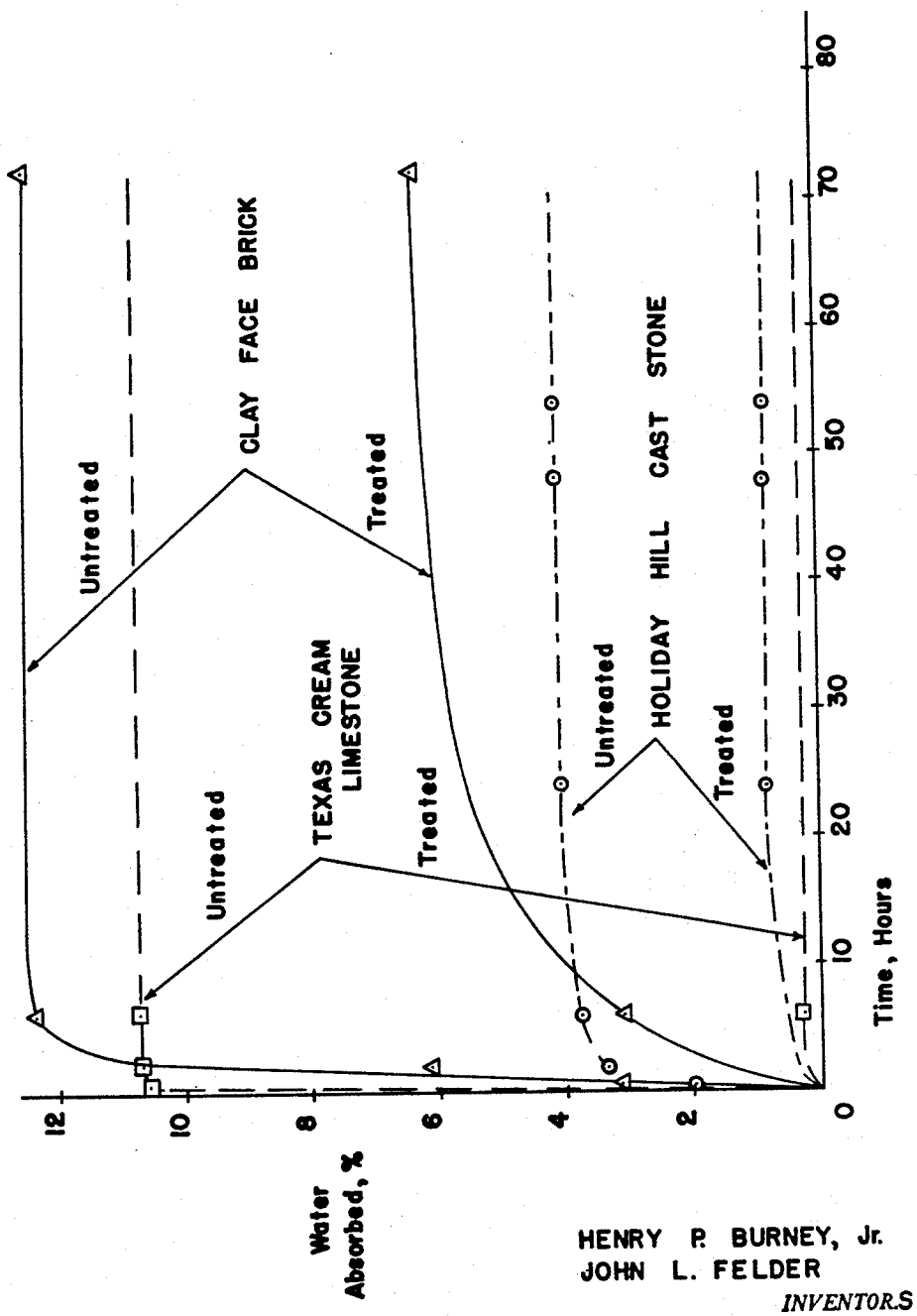

2,758,033
ARTIFICIAL LIMESTONE

Henry Prather Burney, Jr. and John Lawson Felder, San Antonio, Tex.

Application July 14, 1952, Serial No. 298,775

15 Claims. (Cl. 106—97)

The present invention relates to a cementitious composition of matter that contains a relatively large percentage of fines passing 100 mesh and below, which, when mixed with water produces an artificial limestone the granular structure of which is similar in appearance to natural limestone but which is also strong and more water resistant than natural limestone.

In the production of artificial stones, it has been considered heretofore impossible to produce a stone having the appearance of natural limestone, while retaining the strength characteristics of such stone. This is because the granular structure of the limestone consists of fine size particles, which, when the stone is split causes a rupture line that reverses itself many times in all directions as it is split and it has always been considered impossible to incorporate a relatively large percent of fine size particles in a concrete mix to obtain such a rupture line without sacrificing strength of the resulting product.

For example, the United States Department of Interior, Bureau of Reclamation in "A Manual for the Control of Concrete Construction," 4th edition 1942, recommends that the aggregate to be used with Portland cement for producing concrete have the following typical composition: large size aggregate (6" size to No. 4 mesh screen size)—approximately 75 percent of the total aggregate; fine size aggregate (No. 8 mesh screen size to No. 100 mesh screen size)—approximately 25 percent of the total aggregate and not more than 3.9 percent of the total aggregate shall pass or be finer than the No. 100 mesh screen.

Also, it is to be noted that the American Society for Testing Material recommends that not more than 5 percent of the fine aggregate pass or be finer than the No. 100 mesh screen size. Normal engineering practice recognizes that the presence of more than 5 percent aggregate below No. 100 mesh screen size lowers the strength of the resulting concrete, if a large percentage of cement is not added to make up for the lowered strength.

Normally silica sand is used as the fine aggregate in a cementitious mixture and when more than 5 percent such sand contains particles of a size passing No. 100 mesh screen size and below, the resulting product is weak, brittle, porous, and the stone, when split, does not produce a rupture line that is similar to the natural stone.

From the foregoing it can be readily seen that it has long been considered impossible to produce a concrete mixture incorporating therein a large percent of fine aggregate so as to obtain a product having the fine granular appearance similar to natural limestone on the one hand while producing a stone having the necessary strength characteristics for use in construction on the other hand.

However, we have discovered a cementitious composition that not only contains a large percentage of fine aggregate passing No. 100 mesh screen size and below so as to impart the desired appearance to the resulting stone when split, but the composition is strong and water resistant.

An object, therefore, of the present invention is to produce an artificial limestone having the appearance and strength of natural limestone.

Still another obpect of the invention is to provide a cementitious composition of matter containing more than the standard recommended percentage of fines in the aggregate of a particle size passing No. 100 mesh screen size and below so as to impart a desired appearance to the resulting product.

Still another object of the invention is to provide a cementitious composition of matter containing more than the standard recommended percentage of fines in the aggregate of a particle size passing No. 100 mesh screen size and below so as to impart a desired appearance to the resulting product and to use limestone as the aggregate for producing a stone that is also strong and water resistant.

Still another object of the invention is to provide a cementitious composition of matter containing more than the standard recommended percentage of fines in the aggregate of a particle size passing No. 100 mesh screen size and below so as to impart a desired appearance to the resulting product and to use limestone aggregate along with enough silica sand for easily mixing the mass when wet.

Yet a further object of the invention is to provide a mix of Portland cement and limestone, which, when mixed with water will produce a cementitious product having the desirable qualities of natural limestone.

Still another object of the invention is to provide a concrete mixture which incorporates more than 5 percent fine aggregate of a particle size passing No. 100 mesh screen and below without decreasing the strength of the material as would normally be expected by recommended practice.

A further object of the invention is to provide a method for producing artificial limestone wherein the aggregate of the mixture for producing such stone incorporates more than 5 percent fines of a particle size passing No. 100 mesh screen and below comprising the steps of, mixing substantially one part Portland cement with three parts limestone aggregate wherein such aggregate contains more than 5 percent fines of a particle size passing No. 100 mesh screen and below, adding enough water for making the mixture of cement and limestone aggregate compactible, and adding hard fines in a sufficient quantity for preventing the limestone fines from balling while being mixed with the cement.

Still another object of the invention is to provide a cementitious mixture containing 6 to 35 percent particles of a size passing No. 100 mesh screen size and below.

A still further object of the invention is to produce a dense, water resistant stone from cementitious materials by incorporating therein a relatively large percentage of fine size particles which help to fill any voids in the mixture and which particles have a surface tension characteristic such as to make the resulting mix water resistant.

A further object of the invention is to provide a graded stone of proper particle size so as to provide a resulting product that is quite dense.

Other objects and advantages of the present invention will become more readily apparent from a consideration of the following description and accompanying drawing in which the one figure is a graph illustrating absorption tests on a stone produced in accordance with the present invention as compared with absorption test on other masonry units.

We have discovered that a composition may be produced by mixing substantially the following proportions: substantially one part Portland cement, substantially three parts crushed limestone having 6 to 35 percent of a particle size passing No. 100 mesh screen size and below, and a hard material such as silica sand in only a sufficient quantity, such as approximately one part, to prevent balling of the limestone while mixing it with the cement and water, and to serve as a filler. These ingredients may be mixed in dry form and enough water added for making the resulting mixture easy to handle while mixing. Upon curing the stone may be split to desired size.

Particular attention is directed to the presence in the limestone aggregate of the large percentage of the particles having a size passing No. 100 mesh screen size and below. This large percentage of fines of this size in the resulting mix gives a fine granular structure that produces a rupture line that reverses itself many times in all directions as the resulting stone is split. This produces a stone that is similar in appearance to natural limestone. The average compressive strength of a stone produced in accordance with the present invention is 5884 pounds per square inch.

Attention is directed to the drawing wherein the water resistant characteristics of the present invention shown as "Holiday Hill" stone is compared with other masonry units. It is to be noted that the untreated stone of the present invention has far better water resistance than Texas natural limestone, or clay face brick.

Also shown is the comparative water resistance of "water-proofed" or treated artificial stone, natural limestone, and clay face brick.

Of the fines in the limestone aggregate passing No. 100 mesh and below, there will be present, particles of a size passing No. 200 mesh screen and below. It appears that these particles below No. 200 mesh screen size are resistant to water. This is not true with silica sand fines and therefore the aggregate used in our mixture promotes waterproofness of the stone.

However, these small size fines, having a high surface tension, cause the limestone aggregate to form in balls as the cement and limestone are being mixed with water. If an excess of water is added to eliminate this problem, a weak product may result. We, therefore, add a hard mineral material such as silica sand that has hard sharp fines which grind up the balls in a mixture as they are formed, which helps to produce a uniform product and eliminate air pockets in the finished product. The silica sand is also added to act as a filler in the aggregate in the various particle size ranges to correct for deficiences in the various particle sizes of limestone in order to produce a resulting mass of high and uniform density. In this manner, proper gradation of the particle sizes is obtained to impart the desired density to the final product. It has also been found that the uniform density of the final product also increases the waterproofness of the artificial limestone since minute voids are eliminated.

The desired particle range of the limestone may vary from No. 4 mesh screen size through No. 100 mesh screen size. As an example, but not by way of limitation, a typical analysis of crushed limestone suitable for use as aggregate in the present invention is as follows:

| Mesh screen: | Percent passing |
|---|---|
| #4 | 100 |
| #8 | 99.2 |
| #14 | 69.4 |
| #20 | 58.9 |
| #28 | 46.6 |
| #50 | 31.0 |
| #100 | 21.2 |

As mentioned above the percentage of each particle size range is not critical; however, it should be noted that a fairly even distribution in the various particle size ranges between No. 4 mesh screen size and through No. 100 mesh screen is desirable to obtain proper particle size gradation and at least 6 percent to 35 percent of the limestone aggregate should be of a size passing No. 100 mesh screen size and below in order to obtain the desired granular structure of the stone in splitting. Preferably the percentage of fines in the limestone passing No. 100 mesh screen size and below is between 18 and 25 percent.

Since the aggregate passing the No. 100 mesh screen size and below also includes those passing No. 200 mesh screen and below it seems obvious that the percentage of fines passing No. 100 mesh screen size and below is increased it is necessary to add more hard material such as silica sand to prevent balling of the composition while mixing it with water. For example, if the percentage of fines in the limestone aggregate passing No. 100 mesh screen size and below approaches 30 to 35 per cent, the mixture may consist of substantially two parts cement, two parts limestone and three parts silica sand aggregate having sharp hard fines. However, a product having such a high percentage of fines is difficult to work because of the balling and stickiness and when the silica sand approaches this high portion in the composition, the appearance of the stone is less like that of natural limestone and the product is not as strong. Therefore, the preferable mixture is one part cement, three parts crushed limestone having 18 to 25 per cent of a particle size passing No. 100 mesh screen size and below, and having one part hard material such as silica sand.

It should also be noted that any hard mineral material like granite, perlite, marble, slate, shale, etc. may be used in place of the silica sand since it serves primarily as a filler and for inhibiting the "balling" of the limestone and cement when mixed with water. By way of example only, and not as a limitation, an analysis of a sample of silica sand suitable for use in the present invention is as follows:

| Mesh screen: | Per cent passing |
|---|---|
| #6 | 100 |
| #14 | 95.3 |
| #20 | 90.8 |
| #28 | 77.0 |
| #50 | 26.0 |
| #100 | 4.3 |

Since the silica sand also serves the purpose of a filler it is desirable to have a fairly even distribution between No. 6 mesh screen and passing No. 100 mesh screen size and having sharp hard fines. This, as previously discussed helps to give a product of uniform density throughout the desired particle size range.

By way of theory and further explanation as to why we are successful in using more than the recommended percentage of fines passing No. 100 mesh screen and below in our product, the following is given: Portland cement is manufactured from limestone and therefore has a natural affinity for limestone and whereas limestone is normally considered a poor aggregate for cement, this is not true in our case since we have no large particles present in our mix and the large percentage of fines appear to actually reduce the part that the strength of the limestone plays in the total picture. The fines actually become a part of the cement matrix giving an over-all higher strength than would be expected. The fines becoming a part of the matrix produce a very dense product which produces great strength. Also, it would appear that the fines in our composition combine chemically with the Portland cement.

The present invention lends itself quite well to providing limestone of varying shades and colors. Natural limestone is white or cream, and any color pigment or shade can be added to the composition of the present invention to provide a colored limestone. Also, it is possible to easily provide the desired shape to stone produced by our method.

By way of further explanation, it appears that the limestone particles of 100 mesh size and above have a tendency to retain moisture which helps in the proper curing of the product. On the other hand, the surface tension of the fines below 100 mesh size is such that, when used in relatively high percentages as in the present invention, the product is resistant to water after curing of the stone. The high percentage of fines also aids in filling in voids that might otherwise be present in the stone.

As a matter of fact the more limestone used, the better the product and the only reason for using silica sand is to act as a filler and to prevent "balling" of the mixture as it is now mixed in our present method. However, we have successfully produced stone consisting solely of limestone and cement in substantially the following proportions: one part cement and four parts limestone aggregate. A stone of these proportions of constituents is extremely similar to natural limestone, yet strong and water resistant.

The composition may be mixed in any suitable manner such as by a standard blade type concrete mixer and while we have given several preferred percentages of constituents, it should be noted that the exact proportions can be varied without departing from the scope of the invention. For example, two or three parts cement to one or two parts limestone may be used, but this is economically impractical. Furthermore, when the sand content approaches 60% of the total aggregate the resulting product is not as strong.

Broadly the invention relates to a composition of matter consisting of cement and crushed limestone and more particularly to a mixture of cement and crushed limestone having a substantially large percentage of crushed limestone particles passing No. 100 mesh screen size and below for producing artificial limestone that has a granular structure similar to natural limestone and which also has high strength and is water resistant.

What is claimed is:

1. A masonry building unit consisting essentially of one part Portland cement and an aggregate of substantially four to six parts crushed limestone having a particle size range less than No. 4 mesh screen size with more than 5 but less than 35 percent of such aggregate consisting of fines 100 mesh and below.

2. A masonry building unit consisting esesntially of one part Portland cement and an aggregate of substantially three parts crushed limestone, and substantially one part of a material consisting essentially of sharp, hard fine mineral particles with the limestone aggregate having a particle size range less than No. 4 mesh screen size with 5 to 35 percent of such limestone aggregate consisting of fines 100 mesh and below.

3. A masonry building unit consisting essentially of one part Portland cement and an aggregate of substantially three parts crushed limestone and substantially one part of silica sand with the sand consisting essentially of sharp hard fines, with the limestone aggregate having a particle size range less than No. 4 mesh screen size with more than 5 but less than 35 percent of such limestone aggregate consisting of fines 100 mesh and below.

4. A masonry building unit consisting essentially of one part Portland cement and an aggregate of substantially three parts crushed limestone and substantially one part of granite with the granite consisting essentially of sharp hard particles with the limestone aggregate having a particle size range less than No. 4 mesh screen size with 5 to 35 percent of such limestone aggregate consisting of fines 100 mesh and below.

5. A masonry building unit consisting essentially of one part Portland cement and an aggregate of substantially three parts crushed limestone and substantially one part of perlite with the perlite consisting essentially of sharp hard fines, and with the limestone aggregate having a particle size range less than No. 4 mesh screen size with 5 to 35 percent of such limestone aggregate consisting of fines 100 mesh and below.

6. A masonry building unit consisting essentially of one part Portland cement and an aggregate of substantially three parts crushed limestone and substantially one part of marble with the marble consisting essentially of sharp hard fines, with the limestone aggregate having a particle size range less than No. 4 mesh screen size with 5 to 35 percent of such limestone aggregate consisting of fines 100 mesh and below.

7. A masonry building unit consisting essentially of one part Portland cement and an aggregate of substantially three parts crushed limestone and substantially one part of slate with the slate consisting essentially of sharp hard fines, with the limestone aggregate having a particle size range less than No. 4 mesh screen size with 5 to 35 percent of such limestone aggregate consisting of fines 100 mesh and below.

8. A masonry building unit consisting essentially of one part Portland cement and an aggregate of substantially three parts crushed limestone and substantially one part of shale with the shale consisting essentially of sharp hard fines, with the limestone having a particle size range less than No. 4 mesh screen size with 5 to 35 percent of such limestone aggregate consisting of fines 100 mesh and below.

9. A masonry building unit containing crushed limestone aggregate which is bonded by Portland cement, said building unit consisting essentially of crushed limestone aggregated graded in particle size from particles of No. 4 mesh screen size through particles passing through No. 100 mesh screen size and Portland cement in a relative minor amount in proportion to the total mixture of aggregate to bond the crushed limestone aggregate to form the building unit.

10. A masonry building unit containing crushed limestone and sand aggregate which is bonded by Portland cement, said aggregate consisting essentially of crushed limestone graded in particle size from particles of No. 4 mesh screen size through particles passing through No. 100 mesh screen and sand, the sand comprising not in excess of approximately 60% of the total aggregate and consisting essentially of particles from No. 4 mesh screen size and below, and Portland cement in a relative minor amount in proportion to the total mixture of aggregate to bond the limestone and sand to form the building unit.

11. A masonry building unit containing crushed limestone and mineral filler aggregate bonded by Portland cement, said aggregate consisting essentially of crushed limestone graded in particle size from particles of No. 4 mesh screen size through particles passing through No. 100 mesh screen size, the mineral filler comprising not in excess of approximately 60% of the total aggregate and consisting essentially of particles from No. 4 mesh screen size and below and cement in a relative minor amount in proportion to the total mixture to bond the limestone and mineral filler to form the building unit.

12. A masonry building unit containing crushed limestone aggregate which is bonded by Portland cement, said building unit consisting essentially of crushed limestone aggregate graded in particle size from particles of No. 4 mesh screen size through particles passing through No. 100 mesh screen size, said aggregate having particles in excess of 5% passing 100 mesh and Portland cement in a relative minor amount in proportion to the total mixture of aggregate to bond the crushed limestone aggregate to form the building unit.

13. A masonry building unit containing crushed limestone and sand aggregate which is bonded by Portland cement, said aggregate consisting essentially of crushed limestone graded in particle size from particles of No. 4 mesh screen size through particles passing through No. 100 mesh screen and sand, the sand comprising not in excess of approximately 60% of the total aggregate and consisting essentially of particles from No. 4 mesh screen size through particles passing through No. 100 mesh screen, said aggregate having particles in excess of 5% passing 100 mesh and cement in a relatively minor amount in proportion to the total mixture of aggregate to bond the limestone and sand to form the building unit.

14. A masonry building unit containing crushed limestone and mineral filler aggregate bonded by Portland cement, said aggregate consisting essentially of crushed limestone graded in particle size from particles of No. 4 mesh screen size through particles passing through No. 100 mesh screen size the mineral filler comprising not in excess of approximately 60% of the total aggregate and consisting essentially of particles from No. 4 mesh screen size through particles passing No. 100 mesh screen, said aggregate having particles in excess of 5% passing 100 mesh and cement in a relative minor amount in proportion to the total mixture to bond the limestone and mineral filler to form the building unit.

15. A masonry building unit containing crushed limestone aggregate which is bonded by Portland cement, said building unit consisting essentially of crushed limestone aggregate having particles of a size passing 100 mesh screen size and below in an amount greater than 5% but less than 35% of the total aggregate, and Portland cement in an amount in proportion to the aggregate of limestone to bond the crushed limestone to form the building unit.

References Cited in the file of this patent

UNITED STATES PATENTS

| | | |
|---|---|---|
| 1,597,103 | Oberheer | Aug. 24, 1926 |
| 1,805,431 | Ryder | May 12, 1931 |
| 1,848,934 | Case | Mar. 8, 1932 |
| 2,194,777 | Tyler | Mar. 26, 1940 |
| 2,572,510 | Orsini | Oct. 23, 1951 |

FOREIGN PATENTS

| | | |
|---|---|---|
| 635,354 | Great Britain | Apr. 5, 1950 |

OTHER REFERENCES

Webster's New International Dictionary, 2nd ed. (1940) p. 377.